Patented Nov. 25, 1952

2,619,445

UNITED STATES PATENT OFFICE 2,619,445

RUBBER-TO-METAL ADHESIVES AND METHOD OF MAKING SAME AND USE THEREOF

Edward F. Kalafus, Akron, Ohio, assignor to The General Tire and Rubber Company, Akron, Ohio, a corporation of Ohio No Drawing. Application September 16, 1949, Serial No. 116,207

19 Claims. (Cl. 154—130)

1

This invention relates to rubber-to-metal adhesives, composite articles comprising rubber and a rigid material such as metal, and the method of making such rubber-to-metal adhesives and such composite articles.

The vulcanization or the adhesion of rubber to metal has been accomplished heretofore by various processes. The adhesion of rubber to metal was accomplished by curing the rubber compound bonded to metal against interposed layers of hard rubber compound, rubber isomers, rubber chloride or hydrochloride, and other conversion products of natural rubber. The rubber conversion products were prepared by reacting natural rubber in a form having thin section with a salt of a strong acid and a weak base, as described in one or more of the Thomas Raymond Griffith United States Letters Patent, Nos. 2,311,656, 2,340,321, 2,366,895, and 2,386,213.

All such adhesives produce rubber articles considerably superior to those of the prior art. The strength of the bond at elevated temperatures are very materially less than the strength of the bond at normal temperatures. Considerable difficulty was still had in removing freshly molded hot composite articles from a hot mold.

In the preparation of adhesives according to the Griffith process it is essential to utilize natural rubber as the various synthetic rubbers, such as the copolymer of butadiene and styrene, when substituted for natural rubber in accordance with the Griffith patents do not produce a reaction product capable of forming bonds. In fact it is even doubtful whether any reaction product is produced with the generally used synthetic rubbers, such as the butadiene-styrene copolymers. This even though there is an implication in these patents that various synthetic rubbers may be used.

Rubber chloride and rubber hydrochloride, while capable of adhering rubber to metal, have many disadvantages, including corrosive tendencies due to breakdown by dehydrohalogenation or dehalogenation, etc. They are also subject to the disadvantage of deterioration substantially under shock as well as a marked deterioration in bond strength at elevated temperatures.

It is an object of the present invention to provide a rubber-to-metal adhesive capable of adhering rubber compounds, particularly the general purpose type of rubber compounds such as natural rubber compounds, compounds of copolymers of butadiene and styrene, etc. to metal, which adhesive is noncorrosive, has superior bond strength to those heretofore produced, has

2 exceptionally good adhesion at high temperatures, is noncorrosive to metal, and has superior shock resistance.

It is another object of the present invention to provide a method of making an adhesive capable of bonding rubber to metal and forming strong bonds at elevated temperatures, etc.

It is a further object of the present invention to provide composite articles and a method of making such articles of metal or a rigid material and a vulcanized soft rubberlike composition, which composite articles have the rubber exceptionally strongly bonded to the metal, even at substantially elevated temperatures.

Other objects will be apparent from the following description of the invention.

Rubbers and metal are bonded together in accordance with the present invention by forming a reaction product of one or more hereinafter-described acidic substances with a certain basic copolymer, forming a film on the metal or rigid material of an adhesive cement of said reaction product, and vulcanizing a suitable rubberlike polymer against said film, with or without an added layer of tie cement.

The copolymer, which is necessary for the production of adhesives of the present invention, may be formed by polymerizing from a mixture having as essential components (a) one or more polymerizable conjugated diolefinic compounds and (b) one or more mono-olefinic compounds containing a nitrogen group as a constituent of an organic ring, in which mono-olefinic compounds the olefinic group is attached directly to said ring. Any mono-olefinic compound copolymerizable with a conjugated diolefinic compound and containing a nitrogen atom as a component of the ring, which ring is connected to an olefinic carbon atom, may be used to form copolymers with any of the polymerizable conjugated diolefinic compounds of less than seven aliphatic carbon atoms and such copolymers may be used in producing adhesive in accordance with the present invention.

The mono-olefinic compounds containing ring nitrogen are the predominant reactive constituents of the copolymers used in preparing the adhesives of the present invention. Most of such mono-olefinic compounds are included within the following general formula

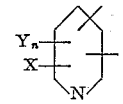

where the shown free valences are each satisfied either by hydrogen or by single carbons that are part of a second ring condensed with the shown pyridine or nitrogen-containing ring, as in the case of quinolines; where "Y" is selected from the same or different members of the group consisting of alkyl (including methyl, ethyl, propyl, etc.) and halogen (including chlorine, fluorine, bromine or iodine); where "$n$" is zero or an integer no larger than 3; and where "X" is selected from vinyl and isopropenyl groups. The compounds of the above general formula are further qualified in that when "X" is isopropenyl, ring carbon atoms adjacent that carrying an isopropenyl group are free of substituents, i. e. are connected to hydrogen. This latter is essential in order that the compound be not prevented by steric considerations from copolymerizing with the conjugated diolefinic compounds. When "X" is a vinyl group, the adjacent carbon atoms may be substituted without interfering with copolymerization.

Examples of compounds within the above general formula include the various vinyl and isopropenyl pyridines, picolines and quinolines, such as 2-vinyl-5-ethyl pyridine; 2-vinyl pyridine; 4-vinyl pyridine; 3-vinyl pyridine; 2-vinyl-4,5-dichlorpyridine; 2-isopropenyl-4,5-dichlorpyridine; 2-isopropenyl-4-methyl-5-chlorpyridine; 2-vinyl-3-methyl-5-chlorpyridine; 2-vinyl-3,4,5-trichlorpyridine; 2-vinyl-3,4-dichloro-5-methyl pyridine; 2-vinyl quinoline; 2-isopropenyl quinoline; 2-vinyl-3,6-dichlorquinoline; etc.

The conjugated diolefinic compounds provide compatibility of the adhesive of the present invention with rubbery polymers as well as permit curing or crosslinking of the adhesive by vulcanizing agents. Any one or more polymerizable conjugated diolefinic compounds may be present in admixture with the ring nitrogen-containing monovinyl compound or compounds (a plurality of which may be present) in forming the copolymer, although when the adhesive is to be utilized in bonding hydrocarbon rubbers it is preferred that the diolefinic component of the aforementioned copolymer be a diolefin such as isoprene, butadiene and 2,2-dimethyl butadiene. When the adhesive is utilized for bonding chloroprene or nitrile polymers, it is often advantageous that some of the conjugated diolefinic component be a nonhydrocarbon, such as chloroprene, cyanoprene, etc. It is generally preferable that the diolefinic compounds have no more than six aliphatic carbon atoms as it is more difficult to obtain an adhesive of sufficient hardness without reducing the percentage of conjugated diolefinic compound below the amounts found most desirable for effecting crosslinking of the adhesive produced.

While the adhesive of the present invention may comprise merely one or more of the ring nitrogen-containing monovinyl compounds, such as vinyl pyridine, and one or more conjugated diolefinic compounds, such as butadiene or isoprene, a third copolymerizable monovinyl compound free of ring nitrogen is desirable and is in fact preferable as a film-hardening agent. The third monovinyl compound may be any monovinyl compound copolymerizable with the other ingredients, although those monovinyl compounds which polymerize to produce a relatively hard resinous material are preferred. Examples of such preferred hardeners are styrene, alpha-methylstyrene, mono- and dichlorostyrenes, and 3,4- and 3,5-dichloro-alpha-methylstyrenes, methyl methacrylate, etc. Methyl acrylate, while not as desirable as are the harder setting monomeric materials, may also be used.

The adhesives of the present invention may be modified to obtain improved adhesion to the various types of synthetic rubbers or rubbery polymers. When it is desired to produce adhesion to any nonpolar rubbery materials, such for example as natural rubber, the various hydrocarbon rubbers such as GR-S (a copolymer of butadiene and styrene), etc., it is preferred that the third monomer or hardener be largely a nonpolar material, such as styrene or one of the ring-substituted styrenes, an alpha-methylstyrene including ring-substituted styrenes, and alpha-methyl-styrene. When it is desired that the adhesive be primarily adapted to adhere polar rubbery materials, it is desired that at least a portion of the hardening component be a polar material, such as acrylo and/or methacrylo nitriles, methyl methacrylate, etc., or that the entire monovinyl component be ring nitrogen-containing mono-olefinic compounds.

In order to obtain adhesion to rubber and to metal, however, I have found that the film of adhesive applied between the rubber and the metal should be compatible or curable with the rubber to be joined, and that it should have sufficient rigidity or hardness, i. e. be harder than most rubbery polymers. This latter is particularly essential where there is a tendency to wipe the ahesive from the metal during the curing or molding process. For these reasons, the diene component, while necessarily present in an amount of at least 20% for compatibility with the rubbery polymer, should preferably always be less than the total amount of hardening or mono-olefinic components of the polymer (including the nitrogen-containing mono-olefinic compound). It may be present in larger amounts, up to 75% of the weight of the copolymer when mold-flow it not troublesome, but about 25% to about 45% of diolefinic compounds are usually preferred.

The nitrogen-containing mono-olefinic compound to provide a good heat-resistant bond to metal should be present in the copolymer in amounts of at least 10% of the weight of the copolymer, and it may constitute the sole hardening ingredient, if desired. However, it is preferred that at least part of the hardener (i. e. mono-olefin compounds copolymerizable with the diolefines) in the copolymers used as a base in preparing adhesives of the present invention be one or more mono-olefinic compounds which do not contain acid-reactive ring nitrogen, i. e. which are free of ring nitrogen groups. The preferred amount of copolymerized mono-olefinic compounds containing ring nitrogen is about 20% to 35 or 40% of the weight of the copolymer. The total of the mono-olefinic or hardening components of the polymeric base material should not exceed 80% of the weight of the polymer.

From the above, it is seen that the polymeric base material for production of generally used adhesives of the present invention comprises from 20% up to 50% of at least one conjugated diolefinic compound, at least 10% and preferably 20 to 40% of a mono-olefinic compound such as vinyl pyridine containing ring nitrogen, a total of 10 to 80% of mono-olefinic compounds copolymerizable with said conjugated diolefinic compounds, which copolymerizable mono-olefinic compounds may comprise 0% to 70% of resin-forming mono-olefinic compounds free of ring nitrogen and suitable as hardeners.

The polymeric base material as above defined may be formed by mixing the copolymerizable ingredients thereof and polymerizing them en masse or in emulsion, or by other means. However, emulsion copolymers are preferred as the basic polymeric materials for reaction with the acidic compounds for forming the adhesives of the present invention.

In emulsion polymerization technique, the mixture of monomers is emulsified in an aqueous solution of an emulsifying agent (generally a larger quantity of solution than the weight of the monomer), a suitable polymerization catalyst and modifier, such as lauryl mercaptan or an organic mercaptan such as a suitable water-soluble peroxide or persalt, such as potassium persulfate. However, any system of polymerization may be used, such for example as used for preparing GR-S rubber. The emulsion thus prepared is usually maintained with constant stirring at a temperature at which polymerization occurs with reasonable rapidity. The temperature depends upon the particular polymerization receipe utilized, as recognized by those skilled in the art.

The polymer formed, if produced in emulsion, is coagulated with suitable means, such as by the addition of a salt and an acid, such as acetic acid, to form a crumb which is washed and dried.

The polymerized base polymer in accordance with the present invention is reacted with an acidic substance capable of reacting with a ring nitrogen of the vinyl pyridine or other nitrogen-containing mono-olefinic compound. The acidic substance should be acid in water, should comprise an anion which when coupled to hydrogen forms an acid stronger than acetic acid and preferably should comprise a polybasic or polyvalent anion of an inorganic acid, such as phosphoric, sulfuric, etc. The character of the acidic substance in the polymer determines in large measure some of the minor but important characteristics of the adhesive formed. The acidic substances include the salts of relatively strong inorganic acids, such as sulfuric and hydrochloric acids, with any weakly basic materials, such for example as iron, zinc, aluminum oxides, etc., these acids themselves, the acid salts of somewhat weaker or medium strength acids such as phosphoric acid, etc. Partial esters of said acids are also applicable as are any other acidic salts or potentially acidic salts that form addition compounds with vinyl pyridine. If the salt of the acid used in forming the reaction product is water-soluble, then the reacted polymer is substantially always water-soluble or sensitive to water. If on the other hand the acidic substance forms with zinc, aluminum, lead, iron or other metal, which metal is present in the mix, an acidic substance that is not water-soluble, then I have found that the reaction product and the adhesive formed therefrom is not noticeably water-sensitive. For this reason, phosphoric acid or an acid salt of phosphoric acid is preferably present as at least one of the reactants in forming the adhesive. Organic acids such as the sulfonic acids, of which benzene sulfonic acid is illustrative, while forming an adhesive do not react to form one with all the desirable properties of those formed from basic inorganic acids that form water-insoluble salts with metals.

While phosphoric acid and phosphorous acids themselves react with the above-described copolymers to form desirable adhesives, particularly when an insolubilizing metal or metal oxide, such as iron, zinc, lead, aluminum or the like, is present in the mix to react therewith, the acid phosphoric esters, i. e. esters of phosphoric acid having at least one acid hydrogen and preferably two available, or acidic salts of phosphoric acid, such for example as monocalcium phosphate, etc., are preferred. Salts of amphoteric metals, such as zinc and aluminum phosphates, even though they may be nonacidic in water, are essentially acidic in the presence of a basic substance, like the nitrogen of the polymer. Hence, zinc phosphate forms a desirable adhesive. It is desirable in any case that a salt or ester of an acid be used instead of the free acid. However, the preferred acidic ingredient may be formed in the rubber, i. e. one may separately add phosphoric acid and zinc oxide or lead oxide, for example, to the compound while on the mill or in a suitable mixer to produce a reaction product of the present invention.

Examples of the more desirable acidic substances which may be used in forming the reaction products suitable for adhesives are the acid phosphates or compounds containing an

grouping, including partial phosphoric acid esters, alkyl phosphates such as the mono-alkyl phosphates, including the monomethyl, ethyl, amyl and hexyl phosphates, mono-, di- and trichlorethyl phosphates, the mono-, di- and trichlormethyl phosphates, the various aryl acid phosphates such as monophenyl phosphate, the acid aralkyl phosphates such as mono-(phenyl-ethyl)-phosphate, the inorganic phosphate such as dicalcium and monocalcium phosphates, etc.

In case water-resistance or water-sensitivity of the adhesive is not important, water-soluble salts such as aluminum sulfate, zinc sulfate and the like may be used as reactants in forming the reaction product. A mixture of such compounds with the above phosphate salt may also be used, if desired. Lead sulfate, which is a substantially water-insoluble sulfate, may also be used to form a water-insoluble reaction product.

In preparing the reaction product, one or more of the above acidic substances may be mixed into the polymer in any suitable way, as by use of a suitable mixer or a mill. It is preferred that the reaction occur in the presence of some water, but that the amount of water be limited. Hence, although the acidic material may be mixed into the latex prior to coagulation, it is difficult to obtain the degree of reaction obtainable by mastication of the solids.

Even a small proportion of the acidic materials noticeably change the characteristics of the polymer and give an adhesive. As low as 5% of an acidic reactant such as the above-mentioned acid phosphates or salt of a strong acid may be used, providing adhesives suitable for certain applications. The percentage of reactant preferred depends, however, upon the concentration of vinyl pyridine or total amount of this and other mono-olefinic nitrogen-containing materials in the polymer. About 1 mol of hydrogen in the acid phosphates or acidic salt for each mol of vinyl pyridine in the polymer is preferred and appears to give about optimum adhesion, although considerably more and considerably less of the reactive material may be present to still give a desirable adhesive. Generally, however, the acid reactant added to the polymer is about 10 to 40% of the weight of the polymer.

The reaction is generally exothermic and occurs at the slightly elevated temperature of milling or mixing, so that it is usually unnecessary to apply more heat to the product than that formed by the mastication. In some cases, however, it is preferred to conduct the reaction and mixing operation in a hot mixing apparatus. The polymeric material rapidly stiffens and becomes noticeably changed by the reaction with acidic substances. The insolubility of the resultant product in solvent is increased by milling as distinguished from the usual experience with rubber isomers which must be milled to render them more soluble. The reacted product may be dissolved in any suitable solvent and applied as a film-forming adhesive for adhering rubber to metal in accordance with one aspect of the present invention.

The preferred solvents are aromatic primarily in nature or generally comprise aromatic materials, such as benzene, xylene, toluene, etc. A small amount of a polar organic compound, such as pyridine, picoline, aliphatic amine, tetraethylamine, naphthalene, piperidine, aniline or other organic amine, greatly improves the ease with which solutions are formed and is an aid to controlling viscosity. Such materials are preferably present in amounts of about 1 to 10% of the weight of the reacted polymer and about 6% is usually used to obtain the desired viscosity.

In the making of composite articles of rubber and metal, the surface of the metal may be sand blasted or suitably cleaned, or may be provided with a phosphate film. The adhesive is applied as a cement coating to the cleaned surface and allowed to dry. A tie cement comprising a synthetic rubber, such as GR–S, may or may not be superimposed over the hardened coating. Such a cement of butadiene-styrene copolymer is usually desired for natural rubber adhesion. A vulcanizable rubber compound is thereafter cured in contact with the dried films to form a composite article.

The concentration of resin or rather the thickness of the film deposited on the metal markedly affects the strength of the bond between the rubbery material and the rigid material. The thickness of the film is determined by the manner of application to the metal and by concentration of solids in the cement. For normal brushing operations, I have found that the concentration of reacted polymer in the cement should be about 10 to 15%. When the material is brushed very thin, the concentration should preferably be increased to about 20%. When the product is sprayed onto the metal, the concentration should ordinarily be reduced and about 10% of solids is preferred.

While the cement of the polymer per se without further addition may be used to obtain excellent bonds between rubber and metal in accordance with the present invention, I have found that the adhesive can be further improved by the addition of an unsaturated polymerizable acid, such for example as maleic or itaconic acids. Such acids may be present in amounts up to about 10 parts by weight of the reacted polymer. Generally, about 5 parts of one or more of such acids give optimum adhesion and when the concentration is increased above 10 parts, the advantages are considerably reduced.

While a single polymeric material may be used in preparing the adhesive cements, I have found that superior results may be obtained by the use of two polymers of different hardnesses. The harder material apparently sticks more strongly to the metal prior to the vulcanization reaction so that the adhesive is not wiped off during molding operations by flow of the rubber. The softer material is desired for increased compatibility with the rubber. One of the polymers should preferably therefore have a higher conjugated diolefinic compound content than does the other. The polymers may be mixed before or after the reaction, but in general I prefer to mix the polymers prior to reaction with the acidic compounds.

The following examples, in which parts are by weight, illustrate the present invention.

*Example 1*

|  | Polymer "A" | Polymer "B" |
| --- | --- | --- |
|  | *Parts* | *Parts* |
| Butadiene | 25 | 45 |
| Styrene | 50 | 30 |
| 2-Vinyl pyridine | 25 | 25 |

Two separate polymers, "A" and "B," were prepared by separately emulsifying the above-designated mixtures of monomers in 180 parts of water containing 5 parts of a sodium soap of dehydrogenated rosin, about .2 part of potassium persulfate, and about .5 part of lauryl mercaptan. The emulsified mixtures were maintained with constant stirring in an autoclave at about 50° C. until polymerization was substantially complete. The latex thus formed was coagulated with acetic acid, washed and dried to form dry polymers "A" and "B."

*Example 2*

|  | Parts |
| --- | --- |
| Polymer "A" (from Example 1) | 75 |
| Polymer "B" (from Example 1) | 25 |
| Thermatomic carbon black (P–33) | 18 |
| Zinc oxide | 15 to 40 |
| Phosphoric acid (85%) | 27 |
| Phenyl-beta-naphthylamine | 1 |
| Dibutyl phthalate | 8.5 |
| Itaconic acid | 8.5 |

These ingredients were hot milled at a temperature range between 220 to 240° C. for twenty minutes to provide an acidic reaction product. Sixteen parts of the reaction product thus obtained were dissolved in 100 parts of any suitably volatile solvent, such as a mixture of toluene and benzene, containing about 6 parts of picoline to provide a cement. The cement thus obtained was applied to portions of strips of sand blasted steel.

A rubber compound of the following composition,

|  | Parts |
| --- | --- |
| GR–S | 100 |
| Channel black | 50 |
| Zinc oxide | 5 |
| Sulfur | 3 |
| Benzothiazyl disulfide | 1.5 | was sheeted out to a thickness of one-tenth of an inch and placed in contact with the coated surfaces of two strips of the above-coated metal. The strips were maintained in overlapping relation so that there was exactly one square inch of coated overlapped metal in contact with the rubber sandwiched therebetween. The rubber compound of the strips was cured at about 300° F.

while maintaining sufficient pressure on the metal to reduce the thickness of the rubber layer to about .040 inch. The bonded metal strips thus prepared were tested for adhesion by pulling the metal pieces apart in a Tinius-Olsen testing machine. It was found to require about 1400 to 1500 p. s. i. pull to rupture the bond.

*Example 3*

Three separate batches of adhesive were prepared by compounding mixtures of polymers "A" and "B" with the ingredients shown in the following table:

|  | Batch 1 | Batch 2 | Batch 3 |
|---|---|---|---|
| Polymer "A" | 75 | 75 | 75 |
| Polymer "B" | 25 | 25 | 25 |
| Phenyl-beta-naphthylamine | 1 | 1 | 1 |
| Ca(H$_2$PO$_4$)$_2$ | 40 | 20 | 10 |
| Zinc Oxide | 10 | 10 | 10 |
| P-33 (Thermatomic Carbon Black) | 18 | 18 | 18 |

The above ingredients were mixed and dissolved to produce a cement in the same manner as described in Example 2. Metal test strips bonded together by an interposed layer of rubber adhesive, as described in Example 2, showed a tensile strength of about 1500 p. s. i. for the strips bonded together by the adhesive of batch 1, about 1800 p. s. i. for the strips bonded together with the adhesive of batch 2, and about 1200 p. s. i. for the strips bonded with the adhesive of batch 3.

*Example 4*

| | Parts |
|---|---|
| Polymer "A" | 75 |
| Polymer "B" | 25 |
| Zinc oxide | 80 |
| Gastex (nonreinforcing carbon black) | 18 |
| Potassium alum | 180 |

The above ingredients were hot milled for thirty minutes at a temperature between 260 and 270° F. to produce an acidic reaction product. An adhesive was prepared therefrom and applied to test strips which were cured and bonded to GR–S rubber stock, all in the same way as in Example 2. The adhesion to the above GR–S stock was found to be 1400 p. s. i.

When in the above examples a natural rubber compound is substituted for the GR–S compound, a tie cement is prepared from a GR–S compound, such as described above, and the tie cement first disposed over the adhesive layer on the metal. Substantially the same bond strengths between natural rubber and metal are thereby obtained.

When the adhesive of Example 4 is applied to metal test strips and a vulcanizable compound of an acrylonitrile-butadiene copolymer, known as Hycar-OR, is vulcanized in contact therewith in place of the GR–S compound, above described, bonds of about the same strength are produced. When test strips such as above are heated at 250° F. and pulled, it is found that the tensile strength of the composite article thus produced is limited by the strength of the rubber compound as rupture usually occurs in the rubber compound itself.

The adhesives above described form bonds which are very nearly as strong at elevated temperatures as they are at room temperatures. This indicates a different type of adhesive than the rubber-to-metal adhesives before proposed.

In the above examples, the rubberlike compounds bonded to metal may be varied widely to give cured composite articles of rubbery polymers and metal or other rigid material. The strength of the bond is somewhat reduced when the amount of plasticizers or oils in the rubbery compounds is increased.

The butadiene in polymers "A" and "B" may be substituted in whole or in part by other conjugated diolefins and diolefinic compounds, as previously mentioned. The styrene may be substituted in whole or in part by other mono-olefinic compounds, as previously mentioned. A styrene, as before mentioned, is preferred for forming bonds to nonpolar rubbers, however. The percentage of vinyl pyridine and other monomers in the copolymer may be varied as above described, although it is generally undesirable to go above 25 parts of vinyl pyridine because of the expense of this monomer. The vinyl pyridine may be substituted in whole or in part by other ring nitrogen-containing materials to give similar results. The acidic compound used in preparing the adhesives of Examples 2 to 4, inclusive, may as above described be substituted by other acidic compounds, including the organic acid phosphates and other phosphates which react with an alkaline material such as pyridine. Such acidic substances should contain a cationic portion which when coupled with a hydrogen anion is an acid stronger than acetic acid and should preferably be a polybasic acid that forms a water-insoluble salt with iron or a metal in the adhesive itself.

The adhesives of the present invention are non-corrosive. In fact those combining a phosphorous-oxygen linkage have the advantage of inhibiting corrosion. Composite articles formed with the adhesives which are reaction products of acid phosphates, etc. may be boiled for extended periods without deterioration because of the water, although those formed with the adhesive of Example 4, for example, are water-sensitive. These water-sensitive adhesives are superior for adhesion of oil-resistant rubbers, such as the nitrile-diene copolymers. The composite articles formed with adhesives of the present invention may be pounded and subjected to shock for extended periods without noticeable destruction of the adhesive properties.

The ring nitrogen in the adhesives of the present invention apparently reacts with acidic materials to give quaternary ammonium compounds or similar materials that may crosslink or coordinate with solid surfaces of such a metal and form a bind therewith that is not easily removed. It is my belief that it is this type of coordinating linkage that renders the adhesives of the present invention so superior to those of the prior art in that they are so tremendously heat-stable, often having substantially the same amount of adhesion to metal at highly elevated temperatures not destructive to rubber as at normal temperatures.

Although the invention may be employed in various ways, only preferred embodiments have been illustrated and described. Other embodiments may be made within the invention as provided by the patent statutes.

What I claim is:

1. An exothermic reaction product of an acidic material and a copolymer comprising 20 to 50% of at least one conjugated diolefinic compound of less than seven aliphatic carbon atoms and 30% to 50% of a hardening component selected from mono-olefinic compounds copolymerizable with a conjugated diene, at least 10% by weight of said copolymer comprising a mono-olefinic compound which contains a ring nitrogen atom in a ring thereof and which is copolymerizable with said conjugated diolefinic compound, said acidic material having a polyvalent inorganic anionic component which with a hydrogen cation forms an acid that is a stronger acid than acetic acid said reaction product having materially increased stiffness over that of said copolymer.

2. A reaction product of at least 5 parts of an acidic material with 100 parts of a copolymer comprising 20 to 50% of at least one polymerizable conjugated diolefinic compound of less than seven aliphatic carbon atoms and 80% to 50% of mono-olefinic hardener selected from mono-olefinic compounds copolymerizable with a conjugated diene, at least 10% of said copolymer being a vinyl pyridine, said acidic material being acid in water and having a polyvalent component which may act as a anion and which when coupled only with hydrogen is an inorganic acid stronger than acetic acid.

3. A reaction product of an acidic material and a copolymer comprising 20 to 50% of at least one polymerizable conjugated diolefine of less than seven aliphatic carbon atoms and 80% to 50% of mono-olefinic hardener selected from mono-olefinic compounds copolymerizable with a conjugated diene, at least 10% of said copolymer being a vinyl pyridine, said acidic material being present in amounts to cause the stiffening of the copolymer and being acid in water and having an inorganic component which may act as a anion and which when coupled with hydrogen is a polyvalent inorganic acid stronger than acetic acid and having the replaceable hydrogen containing groups connected directly to a single atom.

4. A reaction product of an acidic compound and a copolymer comprising a conjugated diolefine of less than seven carbon atoms, styrene, and a vinyl pyridine, in which copolymer said vinyl pyridine contributes at least 10% of the weight thereof, said diolefin contributes 20 to 50% of the weight thereof, and the total weight contributed by mono-olefinic compounds copolymerized with said diolefine is 80% to 20% of the copolymer, said acidic compound comprising a

grouping.

5. A reaction product of a calcium acid phosphate and a copolymer comprising a conjugated diolefine of less than seven carbon atoms, styrene, and a vinyl pyridine, in which copolymer said vinyl pyridine contributes at least 10% of the weight thereof, said diolefine contributes 20 to 50% of the weight thereof, and the total weight contributed by mono-olefinic compounds copolymerized with said diolefine is 80% to 20% of the copolymer.

6. A rubber-to-metal adhesive comprising a solution in volatile solvent of a reaction product according to claim 1.

7. A rubber-to-metal adhesive comprising a solution in volatile solvent of a reaction product according to claim 4.

8. A rubber-to-metal adhesive comprising a solution in volatile solvent of a reaction product of a phosphate compound reactive with pyridine and a copolymer of from 20% up to 50% of a conjugated diolefine of less than seven carbon atoms, at least 10% of polymerizable vinyl pyridines and up to 70% of a mono-olefinic compound free of ring nitrogen, the total of the mono-olefinic compounds including said vinyl pyridines contributing to the weight of said copolymer being at least as great as the total weight contributed to said copolymer by conjugated diolefines.

9. A method of making a rubber-to-metal adhesive which comprises mixing an acidic substance with a copolymer of at least one polymerizable conjugated diolefinic compound and a mono-olefinic compound containing a nitrogen atom as a member of an organic ring thereof, said acidic substance being present in amounts of at least 5% based upon the weight of said reaction product and being reactive with pyridine, and containing anionic component which when coupled with hydrogen is a polybasic inorganic acid stronger than acetic acid, and dissolving the reaction product in a volatile solvent.

10. A method of making a composite article of rubber and metal which comprises coating a surface of the metal with a solution of a reaction product according to claim 1 to form a film thereon, disposing over said film a vulcanizable rubber compound, and vulcanizing said rubber compound against said adhesive layer and against portions of said metal with the aid of heat and pressure.

11. A composite article of rubber and metal comprising the metal portion having in contact with the surface of the metal a film of the reaction product according to claim 1, and a layer of vulcanized rubber compound bonded through said adhesive layer to said metal portion.

12. A composite article of a vulcanized rubber compound and a rigid material comprising a rigid portion, an adhesive layer of a reaction product according to claim 4 disposed over and in contact with said rigid portion, and a vulcanized rubber compound bonded through said adhesive layer to said rigid portion.

13. A solution in volatile solvent of a reaction product according to claim 4, which solution contains a metal that forms a water-insoluble salt with said anionic component.

14. A solution in volatile solvent of a reaction product according to claim 4, which solution comprises a metal that forms with PO4 a water-insoluble salt.

15. A solution in a volatile solvent of the reaction product of at least 10 parts of an acidic material per 100 parts of a copolymer, said copolymer comprising 20 to 50 per cent of at least one conjugated diolefinic compound of less than seven aliphatic carbon atoms and 80 to 50 per cent of a hardening component selected from mono-olefinic compounds copolymerizable with a conjugated diene and at least 10 per cent by weight of said copolymer comprising a mono-olefinic compound which contains a ring nitrogen atom in a ring thereof and which is copolymerizable with said conjugated diolefinic compound, said acidic material having an anionic component which with a hydrogen cation forms an inorganic acid that is a strongr acid than acetic acid.

16. A method of making a composite article of rubber and metal which comprises forming a film on the metal by coating a surface of the metal with solution according to claim 15, disposing over said films a vulcanizable rubber compound, and vulcanizing said rubber compound against said adhesive layer on portions of said metal with the aid of heat and pressure.

17. A composite article of rubber and metal comprising a metal portion having an adhesive layer deposited from a solution according to claim 15 superimposed thereover, and a layer of vulcanized rubber compound bonded through said adhesive layer to said metal portion.

18. A rubber-to-metal adhesive comprising a solution in a volatile solvent of a reaction product of an acidic compound and a copolymer, said copolymer comprising a conjugated diolefin of less than seven carbon atoms, styrene, and a vinyl pyridine, in which copolymer said vinyl pyridine constitutes at least 10 per cent of the weight thereof, said diolefin constitutes 20 to 50 per cent of the weight thereof, and the total weight contributed by mono-olefinic compounds copolymerized with said diolefin is 80 to 20 per cent of the copolymer, said acidic compound having an

grouping and comprising 10 to 40 per cent of the weight of the copolymer.

19. A solution in volatile solvent according to claim 15 in which said acidic material has an inorganic anion.

EDWARD F. KALAFUS.

REFERENCES CITED

The following references are of record in the file of this patent:

UNITED STATES PATENTS

| Number | Name | Date |
| --- | --- | --- |
| 2,402,020 | Cislak et al. | June 11, 1946 |
| 2,481,810 | Barton | Sept. 13, 1949 |
| 2,481,811 | Barton | Sept. 13, 1949 |
| 2,561,215 | Mighton | July 17, 1951 |

FOREIGN PATENTS

| Number | Country | Date |
| --- | --- | --- |
| 595,290 | Great Britain | Dec. 1, 1947 |